Figure 1:
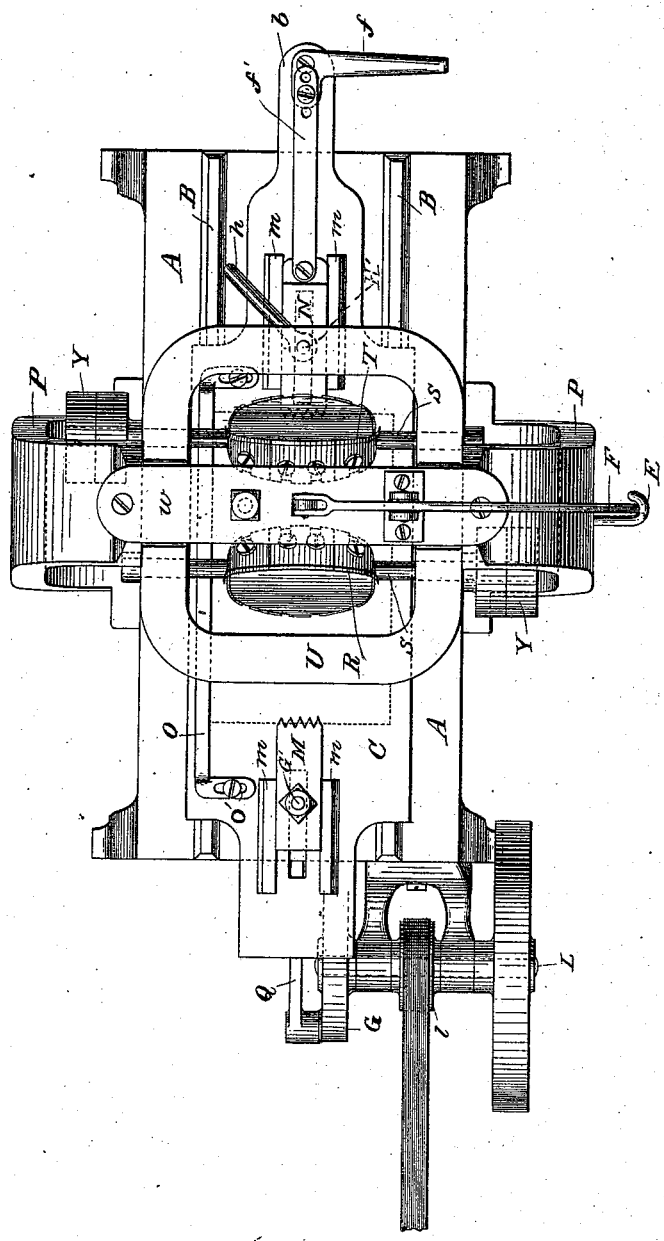

(No Model.)

W. C. FREEMAN.
MACHINE FOR MAKING WOODEN TRAYS, &c.

No. 380,255. Patented Mar. 27, 1888.

3 Sheets—Sheet 1.

WITNESSES:

INVENTOR.
William C. Freeman.
BY
ATTORNEYS.

(No Model.) 3 Sheets—Sheet 2.
W. C. FREEMAN.
MACHINE FOR MAKING WOODEN TRAYS, &c.
No. 380,255. Patented Mar. 27, 1888.
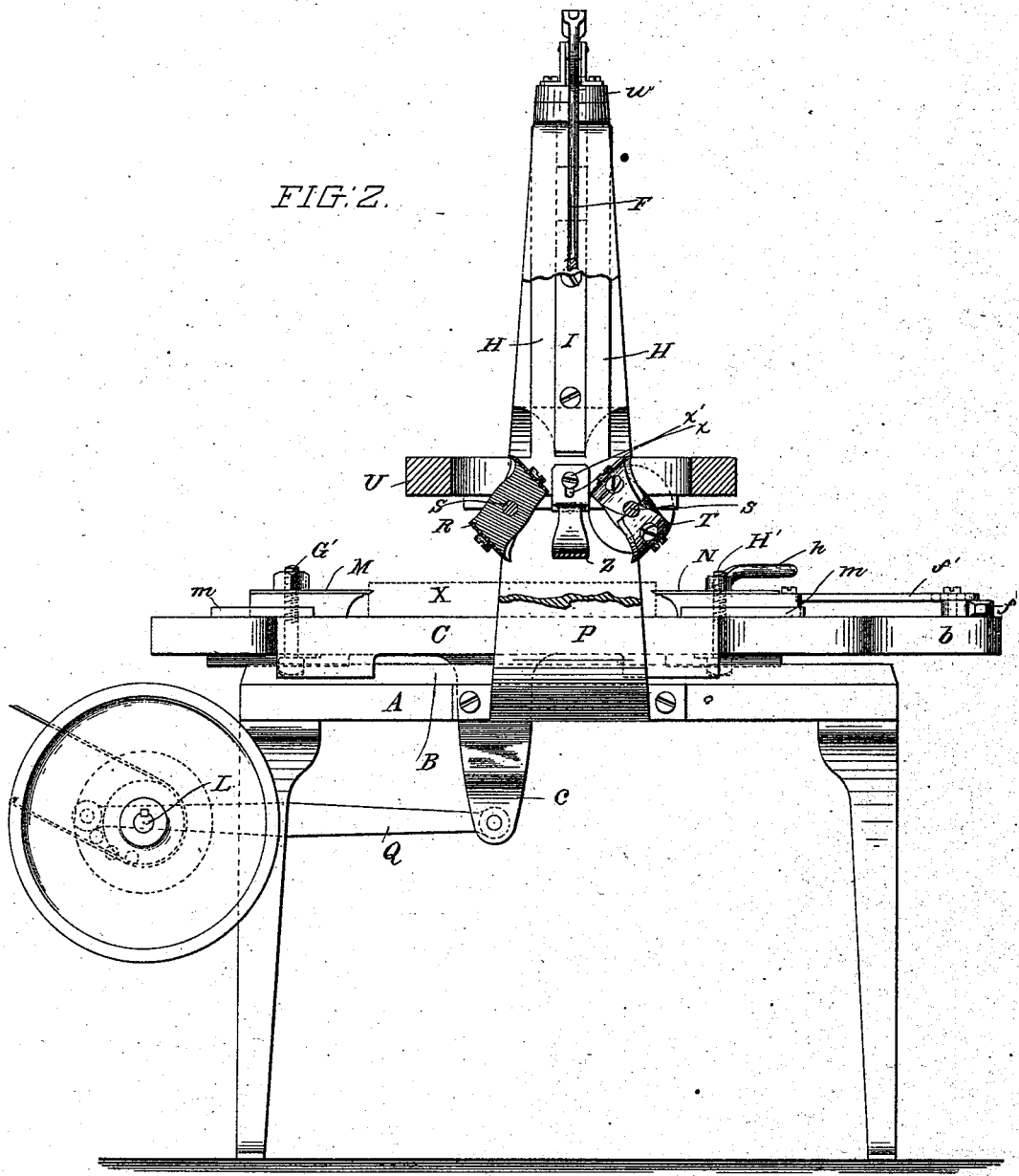
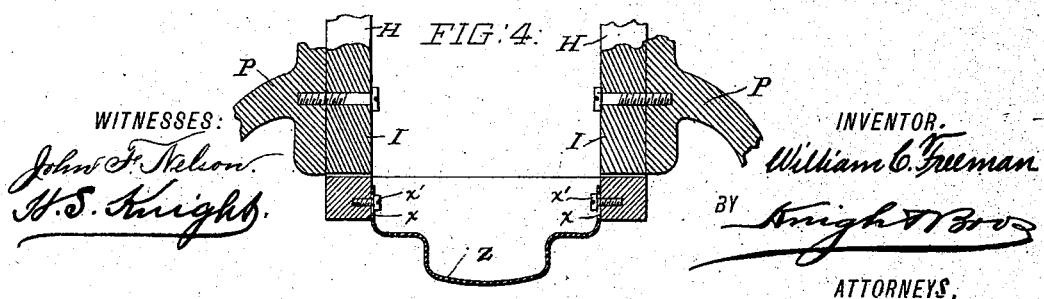
WITNESSES:
John F. Nelson
H. S. Knight
INVENTOR.
William C. Freeman
BY Knight & Bro
ATTORNEYS.

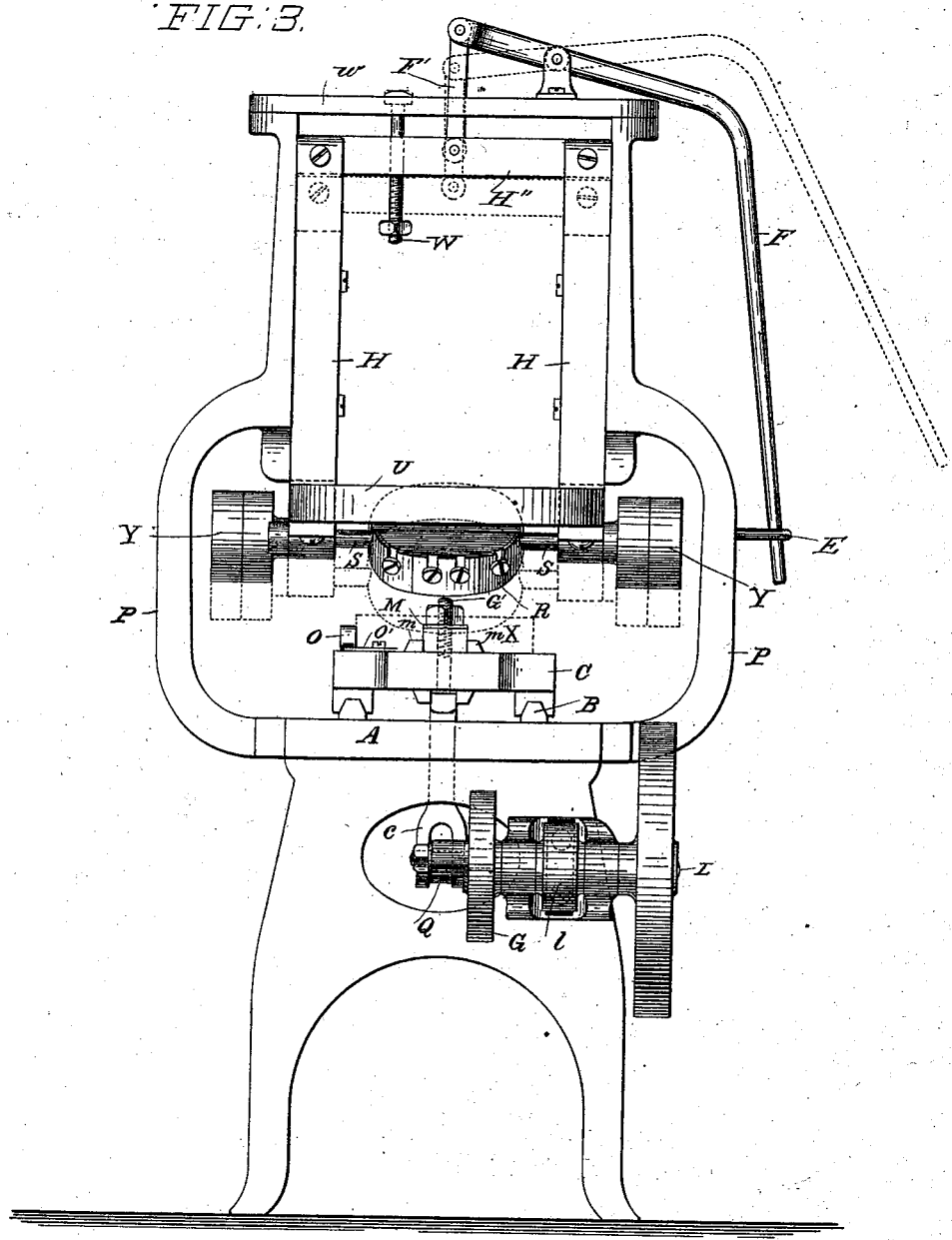

UNITED STATES PATENT OFFICE.

WILLIAM C. FREEMAN, OF LOUISIANA, MISSOURI.

MACHINE FOR MAKING WOODEN TRAYS, &c.

SPECIFICATION forming part of Letters Patent No. 380,255, dated March 27, 1888.

Application filed October 6, 1887. Serial No. 251,018. (No model.)

*To all whom it may concern:*

Be it known that I, WILLIAM C. FREEMAN, a citizen of the United States, residing at Louisiana, county of Pike, and State of Missouri, have invented certain new and useful Improvements in Machines for Making Wooden Trays and Analogous Articles, of which the following is a full, clear, and exact specification.

My invention relates more particularly to a machine for forming the concavity or dish of the tray; and it has for its object to construct a device that will effectually and automatically gouge out the central portion of a suitable block of material from which the article is to be formed.

My invention consists in imparting a reciprocating motion to the block of material, while a pair of rotary knives are caused to revolve in different directions above it, and in various features of construction, which will now be described with reference to the accompanying drawings, and then be more particularly pointed out in the claims.

In the said drawings, Figure 1 is a plan view of the device, showing portions broken away. Fig. 2 is a side elevation, partly in section. Fig. 3 is an end elevation. Fig. 4 is a detail view.

A represents a table or bench, running longitudinally of which are tracks B, upon which is supported the reciprocating carriage C, which has a downwardly-projecting arm, c, which is connected with crank G by means of pitman Q, the crank G being mounted on the shaft L, upon which latter is also mounted a band-wheel, l.

Located at one side of the carriage C is a guide-bar, O, which is provided with slotted feet O' and adjustably secured to the carriage C by means of screws, as shown, for guiding the block of material to its proper position when it is placed upon the carriage.

M N are the dogs which hold the block of material, X, in position on the carriage C, which dogs are guided in ways m and clamped to the carriage by means of bolts G' H', which pass through the dogs and slots in the table and carry at their lower ends ordinary bolt-heads, which abut against the under side of the carriage. The nut on the bolt H', however, is provided with a handle, h, whereby it may be readily loosened to facilitate the removal of the block.

The carriage C has at one end an elongation, b, to the outer end of which is pivoted a bell-crank lever, f, having one arm shaped like a handle and its other arm connected with the dog N by means of a link, f', which latter is provided with a series of holes whereby the length of the link may be adjusted to accommodate different-sized blocks.

Secured to each side of the table A are uprights P, which are connected at the top by a cross-bar, w, and which have inner beads, I.

R T are rotary cutter-heads which are mounted on shafts S, journaled to the under side of the frame U, with their cutting-edges at equal distances from the reciprocating carriage, so that they will cut the block in a plane parallel with its bottom or with the surface of the carriage, and which frame U has guide-arms H H extending upwardly on each side of the beads I and connected at their upper ends by a cross-bar, H''.

F is a lever which is fulcrumed to the cross-bar w and has a downwardly-projecting link, F', which is secured to the cross-bar H'', so as to enable the operator to present the cutters to and withdraw them from the block.

Extending across the frame U is a strip, Z, which is secured to said frame by means of slots x and screws x', and projects downwardly and forms an adjustable foot for supporting the frame when it is lowered and holding the cutters at the proper distance from the block of material.

Projecting downwardly from the cross-bar w is a bolt, W, which passes loosely through the cross-bar H'' and carries at its lower extremity a nut which serves as a stop to the cross-bar H'' and prevents the knives from cutting into the block beyond a certain depth, which may be determined by the location of the said nut on the bolt W.

E is a hook or catch secured to the upright P, by means of which the frame U, in which the cutters are journaled, may be retained elevated with the cutters out of contact with the block by hooking the lower end of the lever F to it.

The cutter-heads R T are provided with adjustable knives which are adapted to cut in opposite directions, so as to gouge the block from both ends toward the center and thus prevent it from splitting, and as the block is continually reciprocated by virtue of its carriage being connected by the pitman Q with the crank-disk G, the central portion is of course cut by both cutters, and thus a smooth and even surface is made.

Each of the shafts S is provided at its outer ends with a pulley, Y, for imparting motion to the cutter-head from any suitable band or cord.

Having thus described my invention, the following is what I claim as new therein and desire to secure by Letters Patent:

1. The combination, with an automatically-reciprocating carriage having clamping-dogs, of a pair of rotary cutters revolving in opposite directions and arranged to cut in the same path, and with their cutting-edges at equal distances from said carriage, substantially as set forth.

2. The combination, with a carriage and an eccentric, with which said carriage is connected and whereby it is continually reciprocated, of a pair of rotary cutters arranged to cut in opposite directions and in the same path and revolving in a plane perpendicular to that of the carriage.

3. The combination, with the carriage C, of a revolving shaft, an eccentric on said shaft having connection with said carriage for reciprocating it, and a pair of rotary cutters arranged to cut toward each other and toward the table and in the same path, substantially as set forth.

4. The combination, with the reciprocating carriage, of the rotary cutters having their cutting-edges at equal distances from said carriage and adapted to cut in opposite directions in the same path and at right angles to the plane of the carriage, substantially as set forth.

5. The combination, with the carriage having suitable clamping-dogs for carrying the block and a track on which said carriage is mounted, of a vertically-sliding frame, rotary cutter-heads mounted in said frame, and a foot, Z, secured adjustably to said frame and adapted to rest upon the cut surface of the block, for the purpose set forth.

6. The combination, with the frame U, of the shafts S S, journaled in said frame, rotary cutter-heads and driving-pulleys on said shafts, a vertical track for guiding said frame, a carriage having suitable clamping-dogs for carrying the material, a track on which said carriage is mounted, and a foot, Z, adjustably secured to said frame and adapted to rest upon the material and thereby limit the bite of the cutters, as set forth.

7. The combination, with a reciprocating carriage for carrying the block of material and the frame U, capable of vertical movement, of two shafts journaled to said frame in a plane parallel with said carriage, but transverse to the line of reciprocation, rotary cutter-heads on said shafts adapted to cut toward each other, a foot, Z, adjustably secured to said frame and adapted to rest upon the material when the cutters enter to a certain depth, and the lever F, for holding the frame aloof, substantially as set forth.

8. The combination, with the frame U, in which the rotary cutters are journaled, of the uprights P, having ways by which said frame is guided, a cross-bar, w, connecting the uprights P, a projection from said frame, a downwardly-projecting bolt secured to the cross-bar w and passing loosely through said projection, an adjustable nut on said bolt adapted to come in contact with said projection and limit the downward motion of said frame, and the lever F, connected with said frame, substantially as and for the purposes set forth.

9. The combination, with the frame U and the uprights P, of the rotary cutters mounted in said frame, the inner beads, I, on said uprights, upwardly-projecting arms H, secured to said frame, the cross-bar H'', secured to the arms H, a cross-bar, w, secured to the uprights P, a downwardly-projecting bolt, W, passing through the cross-bar H'' and carrying a nut, for the purpose described, and the lever F, fulcrumed to the cross-bar w and connected with the cross-bar H'', substantially as and for the purposes set forth.

10. The combination, with the carriage C, having the dog M at one end thereof, of the dog N, located at the other end of said carriage, ways m m for guiding said dogs, the bell-crank lever f, pivoted to said carriage, a link, f', having a number of perforations secured to said dog N and to one arm of the bell-crank, the bolt H', projecting through dog N and the carriage, a nut having a handle on said bolt, the guide-bar O, having slotted feet O', and screws projecting through said slots and into the carriage.

WILLIAM C. FREEMAN.

Witnesses:
J. S. IRWIN,
E. B. RULE, Jr.